May 28, 1935.  R. H. WAPPLER ET AL  2,002,594
INSTRUMENT FOR ELECTROSURGICAL TREATMENT OF TISSUE
Filed March 24, 1933  2 Sheets-Sheet 1
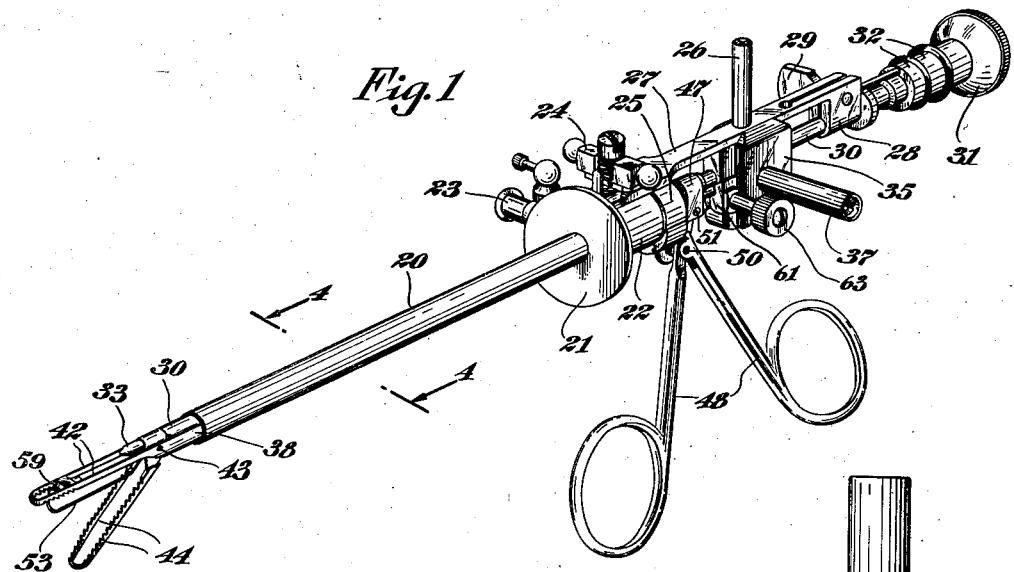
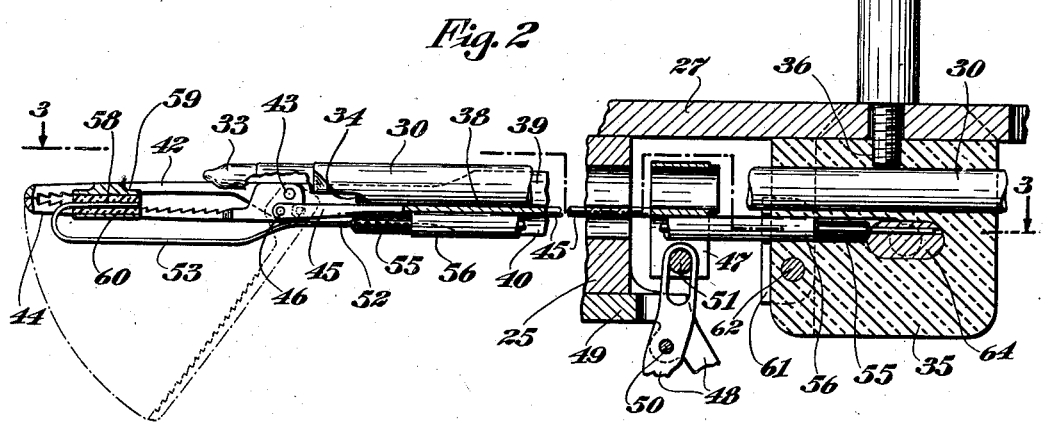
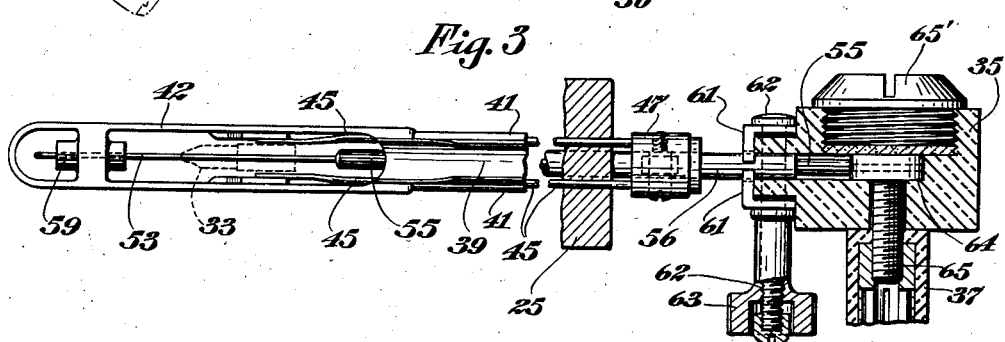
INVENTORS
Reinhold H. Wappler,
Frederick Charles Wappler,
BY
Frederick Breitenfeld
ATTORNEY Patented May 28, 1935

2,002,594

UNITED STATES PATENT OFFICE 2,002,594

INSTRUMENT FOR ELECTRO-SURGICAL TREATMENT OF TISSUE

Reinhold H. Wappler, Yonkers, and Frederick Charles Wappler, New York, N. Y.; Frederick C. Wappler executor of said Reinhold H. Wappler, deceased Application March 24, 1933, Serial No. 662,432

11 Claims. (Cl. 174—89)

Our present invention relates generally to electro-surgery, and has particular reference to an improved method for severing or cutting tissue, and, coordinately, to an improved type of instrument for accomplishing this general object.

While we have herein illustrated and shall hereinafter describe our invention as it may be adapted to the provision of an improved instrument for effecting severance of adhesions or the like, it will be understood that certain broader phases of our invention are not necessarily restricted to a specific application of this character.

Before proceeding to describe our invention, we will preface by stating that the so-called "coagulation" and the so-called "cutting" of tissue, by modern high-frequency electric currents, are two well-recognized and useful phenomena that have won wide favor of late with the profession. While different types of tissue will react somewhat differently to different currents, it has come to be recognized that, for a given type or body of tissue, coagulation is an effect distinctly different from cutting and requiring different currents. Thus, coagulation is usually effected by means of a relatively blunt electrode; and while it might appear offhand that the coagulating effect is the result of diminished current concentration, the fact is that a true coagulating current will not produce cutting, even though a relatively attenuated electrode be employed. By the same token, cutting is usually effected by means of a thinner or finer electrode, which no doubt has a valuable current concentrating effect, but it has been demonstrated that a true cutting current will produce sparking and cutting even though an electrode of greater area be employed.

The cutting effect, as this term has been used in the art and as it is referred to by the profession, refers always to an instantaneous-cutting effect, whereby the mere application of the cutting electrode to the tissue produces an immediate sparking and destruction of tissue. While there is a certain amount of coagulation that takes place during the cutting procedure, it is merely incidental and is not as penetrative or as effective as the pure coagulation which is customarily resorted to to effect hemostasis.

The foregoing differences between "cutting" and "coagulation" are reflected in the development of the art to date. In the development of high-frequency generators, means are usually provided to permit one adjustment to be made for cutting purposes and other adjustments to be made for coagulating purposes. Various attempts have been made to minimize the necessary adjustments and to simplify the manner in which a single generator can be employed to deliver the two types of current which are required. In the development of instruments, separate provisions have usually been made for coagulating and cutting; and where both phenomena are to be available in a single instrument, it has been customary to provide either two separate electrodes (one for one purpose and the other for the other), or to provide a means for interchangeably connecting a single electrode to sources of cutting and coagulating currents.

Our present invention is predicated upon the discovery that, under certain circumstances, and with the proper type of high-frequency generator, a single current, if maintained under proper conditions and applied to a single electrode that is manipulated in the proper manner, a dual effect may be produced whereby the electrode will automatically effect a progressive coagulation or desiccation, and will automatically evolve a condition under which an actual cutting will ultimately take place. We have found, for example, that where a relatively attenuated electrode is pressed firmly into contact with a body of tissue, and maintained in firm contact, under pressure, and if there is supplied to the electrode a high-frequency current which is greater than a coagulating current and less than an ordinary instantaneous-cutting current, the electrode will automatically effect a gradually increasing desiccation and will itself evolve a set of conditions under which it will ultimately sever the tissue with which it is held in contact.

It is because this discovery is of particular importance and utility in connection with the severance of adhesions that we have adapted this phase of our invention, at the outset, in an instrument designed primarily for this specific purpose; and it is this type of instrument which we have herein illustrated and described.

The severance of an adhesion band, for example, in the pleural cavity, is particularly difficult because of the serious consequencies resulting from unchecked hemorrhage. It has proven to be unsatisfactory, in many respects, merely to insert a conventional cutting electrode and to cut through an adhesion with an ordinary instantaneous-cutting current. Apart from other difficulties, most adhesions are in a stretched or tensioned condition when the lung is collapsed to effect pneumothorax, and to cut through a tensioned area of this character is precarious because of the danger that the band will tear or divide prematurely, leaving the stumps in a condition which is not fully hemostatic.

With the object of obviating these difficulties, we have heretofore successfully devised instruments whereby unhurried and thoroughly controllable operations may be performed, under continued and assured illuminated vision, and with minimum danger from the standpoint of hemorrhage. This general type of instrument, which is the type herein illustrated in association with our present improvement, provides for an effcient clamping of the adhesion adjacent to the area at which it is to be cut, and a maintenance of this engagement until the operation of severance has been completed. Preferably, the adhesion is grasped at two spaced areas on opposite sides of the area to be cut; the area is preliminarily coagulated; and the cutting is finally accomplished without releasing the resultant stumps.

We are now enabled to provide an instrument of this general character in greatly simplified and improved form; and it may thus be stated to be a specific object of our present invention to provide an improved instrument for treating and cutting through adhesions or the like. One of the characterizing features of our present instrument lies in an arrangement of parts whereby a single electrode wire is adapted to be pressed into firm and maintained contact with the body of tissue to be cut, and whereby a sustained supply of a particular type of electric current to the electrode will automatically bring about, in succession, the effects heretofore produced by separate means. More specifically, the employment of our present instrument involves nothing more than the clamping of the body of tissue at the desired area, and the maintenance of this clamped relationship during the supply of a current to the electrode which is greater than a coagulating current yet less than an instantaneous-cutting current. The effects produced are (a) a secure grasp of the tissue under treatment; (b) a gradually increasing coagulation and desiccation of the area under treatment (a matter which may take about thirty seconds); (c) a resultant automatic development of a condition which renders the current and the electrode useful for cutting purposes, culminating in an actual severance of the tissue by the electrode (a matter which may take no more than a second or so); and (d) a maintenance of the clamped engagement of the tissue, so that in the case of an adhesion the resultant stumps are held in position for final examination before being released.

In accordance with the general objects of our invention, our present type of instrument is also provided in an efficient and compact manner with a telescopic means, an illuminating means, suitable electric binding posts for establishing the desired connections with a source of high-frequency current, means for efficiently insulating the operative electrode wire from the indifferent portions of the instrument, a mechanism for controlling the movements of the clamping jaws in a simple and reliable manner, a means for permitting removable association of the electrode with the instrument, and means for withdrawing from the area of operation such fumes as may be generated in the vicinity of the telescope objective. The entire instrument is mounted and constructed in a unitary form which permits it to be inserted into the plural cavity through only a single opening provided for this purpose, and the several parts are so constructed and arranged that disassembly for sterilization purposes may be easily accomplished.

The broader phases of our invention, as hereinbefore alluded to, involve an entirely new technique or mode of procedure, which is not necessarily restricted to the particular instrumentality hereinbefore referred to.

We achieve the foregoing objects, and such other objects as may hereinafter appear or be pointed out, in the manner illustratively exemplified in the accompanying drawings, wherein—

Figure 1 is a perspective view of an instrument embodying the features of our present invention;

Figure 2 is an enlarged longitudinal cross-section through the operative part of the instrument of Figure 1, with certain portions omitted for the sake of clearness;

Figure 3 is a plan view, partly in section, taken substantially along the line 3—3 of Figure 2, with certain parts omitted for the sake of clearness;

Figure 4:
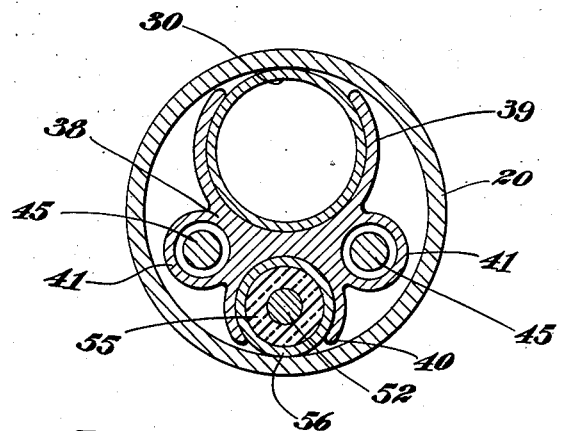
Figure 4 is an enlarged cross-sectional view taken substantially along the line 4—4 of Figure 1.

The endoscopic tube 20 terminates at its rear end in the flange 21 and in the attachment sleeve or neck 22. The neck 22 carries the irrigation outlet 23 and also suitable mechanism, such as the clamp 24, for facilitating association with the tube 20 of the interior removable assembly.

The operative assembly consists of the usual plug 25 whose forward portion (not shown in Figures 2 and 3) is usually slightly tapered and is adapted to fit snugly into the neck 22.

Extending rearwardly from the plug 25 is the supporting arm 27, terminating in its rear end in a bearing 28 and a suitable clamp 29 adapted to engage and secure the rear end of a suitable telescopic device 30. The latter is preferably of the character illustrated and described in United States Letters Patent No. 1,680,491, and consists of an eyepiece 31, suitable terminal bands 32 for establishing electrical connection with the forward illuminating lamp 33, and an objective lens 34 arranged behind the lamp 33 and commanding an obliquely forward field of vision.

The arm 27 also carries an electric binding post 26 which is mounted in uninsulated relationship, so that all of the parts not specifically insulated from the binding post 26, the arm 27, or the plug 25, are in electrical contact therewith.

The arm 27 also carries the insulated terminal block 35, preferably secured by the threaded stem 36 of the binding post 26, as illustrated most clearly in Figure 2. The block 35 carries an insulated binding post 37.

Secured to the plug 25 and projecting forwardly therefrom is the elongated stem 38 provided with the upper guide channel or tube 39, the lower guide channel or tube 40, and the lateral guide tubes 41. The telescope 30 is adapted to be accommodated in the upper tube 39, and it will be understood that the plug 25 and the block 35 are provided with suitable bores through which this telescope may slidably extend.

At the forward end of the stem 38 we mount the stationary or fixed jaw 42, which consists preferably of two spaced parallel arms substantially aligned with the axis of the stem 38. These arms are preferably joined at the forward end, so that the jaw is substantially U-shaped when viewed in a horizontal plane.

Pivoted to the rear of the fixed jaw 42, as at the pivot points 43, is a similarly constructed 2-armed movable jaw 44. This jaw is adapted to be rocked or pivoted from the open full-line position of Figure 1 into the closed full-line position of Figure 2, and this is accomplished by a pair of control rods 45 which are slidably accommodated in the guide tubes 41 and are pivoted at their forward ends to the rear of the movable jaw 44, as at the pivot points 46. These rods extend rearwardly through the tubes 41, thence through suitably prepared bores in the plug 25, and are secured at their rear ends to a member 47 which is under the control of the scissors-like control mechanism 48.

The fixed handle of the latter mechanism is rigidly secured, as at 49, to the plug 25; and the movable handle is pivoted, as at 50, to the fixed handle and has its free end pivotally articulated, as at 51, to the member 47. When the handles 48 are drawn toward each other, the member 47 is advanced forwardly, and this advances the control rods 45 and forces the movable jaw 44 toward its closed position. When the handles 48 are separated by a slight degree, the rods 45 are correspondingly retracted, and the movable jaw is opened into the dot-and-dash position of Figure 2.

The electrode member of the present invention comprises the elongated conductive member 52 which merges at its forward end with the longitudinal electrode wire 53. At its forward end, the wire 53 doubles back upon itself to provide a journal piece 58 arranged substantially along a line parallel to the axis of the instrument.

A sheath of insulation 55 envelops the conductive member 52, terminating short of the wire 53 at the forward end, and short of the extreme rear end of the member 52. The insulation 55 is in turn enclosed in an outer metallic sheath 56 which is somewhat shorter.

In accordance with our invention, the electrode member is removably applicable to the instrument, so that the electrode wire 53 is mounted in fixed relation to the fixed jaw 42. The means for accomplishing this comprises a clamp at the rear of the instrument adjacent to the binding post 37 for engaging the rear end of the electrode member, and a bearing carried by the fixed jaw and adapted to engage the forward end of the electrode wire.

The articulation of the journal piece 58 with the jaw 42 is preferably accomplished by providing a longitudinal bearing 59 between the arms of the jaw 42, the bearing being provided with an insulating lining 60.

The engagement of the rear end of the electrode member preferably consists in providing two opposed chuck jaws 61 upon a threaded stud 62 which extends through the forward portion of the block 35. A rotatable threaded handle 63 is mounted upon the stud 62 and may be tightened or loosened as desired for the purpose of clamping the jaws 61 together or separating them. These jaws thereby engage or disengage the rear portion of the sheath 56, as shown most clearly in Figure 3.

Embedded in the block 35 is a conductive element 64, and this element is provided with a longitudinal bore adapted to receive the rear uninsulated end of the conductive member 52. The interior conductive portion of the binding post 37 is in electrical connection with the element 64, preferably by forming the element 64 with an exteriorly projecting threaded stud 65 onto which the binding post 37 may be screwed and tightened, as shown in Figure 3. Access to the parts, for purposes of assembly and/or repair, may be had through the large opening on the opposite side of the block 35, this opening being normally closed by the threaded plug 65'.

The electrode member is applied to the instrument by sliding it rearwardly through the guide tube or channel 40, the rear end passing through a suitable bore in the plug 25, through a recess in the member 47, and thence into the block 35 through the space between the jaws 61. As the rear end comes into engagement with the conductive member 64, the forward journal piece 58 slides rearwardly into the bearing 59; and when the nut 63 is tightened, the electrode is held in firm locked relationship. The withdrawal is accomplished in the opposite manner.

By virtue of this manner of mounting the electrode member, it is obvious that the electrode wire 53 is brought into electrical connection with the interior of the binding post 37, and is at the same time thoroughly and completely insulated from all other portions of the instrument.

The member 47 is provided with a suitable bore or channel in its upper portion to permit passage of the telescope 39, and the rear portion of the electrode member serves as an efficient guide for the member 47 during the reciprocal movements of the latter.

In accordance with our invention, it is to be noted that the electrode wire 53 is arranged in such a manner that it projects through the arms of the movable jaw 44 when the jaws are closed. Stated otherwise, the electrode wire is arranged in a longitudinal plane passing through the axis of the fixed jaw 42, the wire being offset from the plane of this jaw in the direction of the movable jaw. Accordingly, when any body is clamped by the forward portion of the instrument, it comes first into engagement with the movable jaw 44, on one side, and with the electrode wire 53, on the opposite side. The jaw 44 may, therefore, be said to constitute a member which is adapted to press a body into firm engagement or contact with the electrode wire 53.

The manner in which the instrument hereinbefore described embodies the features of the broader phases of our invention, and permits us to carry out our new technique, is illustrated most clearly in Figures 5–9. The procedure illustrated in these figures consists in electro-surgically coagulating and cutting through a growth, such as an adhesion band 66.

Figure 5:
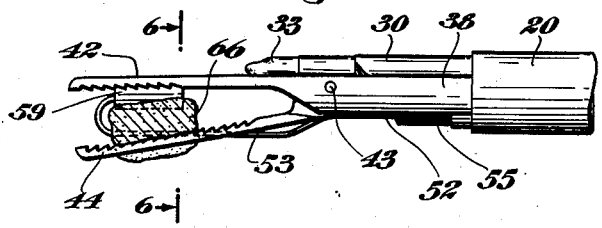
Figure 5 is a longitudinal side view similar to the left end of Figure 2, and showing a step in one mode of use.
Figure 6:
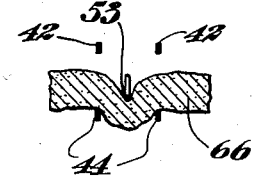
Figure 6 is a diagrammatic cross-sectional view taken substantially along the line 6—6 of Figure 5.
Figure 9:
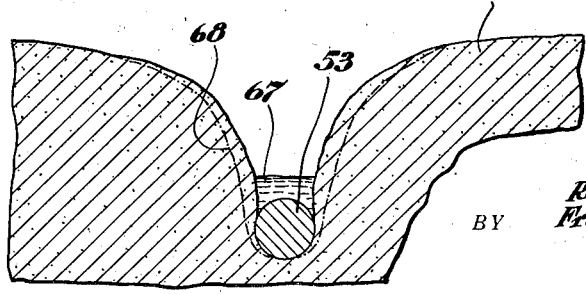
Figure 9 is a view similar to Figure 6 on a greatly enlarged scale, illustrating the progressive effect of our present technique.

The band is first engaged as illustrated in Figures 5, 6, and 9, at the area at which the severance is to take place. The engagement is effected between the movable jaw 44 and the electrode wire 53, and this may be accomplished under illuminated vision, as will be readily understood. The engagement is a firm and tight engagement which embeds the electrode wire 53 well into the surface of the band 66, as illustrated most clearly in Figures 6 and 9. Figure 9 is a view on an enlarged scale, but is not grossly exaggerated, since body tissue readily yields in the manner shown when it is subjected to the squeezing pressure described.

It will be noted, upon viewing Figure 9, that when the clamping is first effected the electrode wire 53 is almost completely surrounded by tissue and/or tissue juices. We have illustratively shown a slight amount of the tissue juices at 67 to illustrate this fact.

A current of the character hereinbefore alluded to is now caused to be supplied to the electrode wire 53. This is preferably accomplished by connecting an indifferent terminal of a suitable source of high-frequency current to the binding post 26, and by connecting an active terminal of said source to the binding post 37. The high-frequency current is preferably of the character generated by an apparatus of the kind which is shown in the copending application of Frederick Charles Wappler, filed December 18, 1931, Serial Number 581,908, Patent Number 1,962,796, the current being an undamped sustained high-frequency current.

The particular current which is fed to the electrode wire 53, in accordance with our invention, is one which is greater than a coagulating current yet less than an instantaneous-cutting current, and the connections are maintained during a maintenance of the clamped relationship illustrated in Figures 6 and 9. The effect is one which we believe to be new in the art, and highly advantageous and useful. A desiccation begins to take place, manifested by the generation of steam bubbles at the area of contact, and as the desiccation continues the area around the wire 53 becomes dryer and dryer. The juices 67 are boiled off, and the juices incorporated in the surrounding tissue are also gradually eliminated, so that a virtual cooking of the tissue takes place. The result is that the area around the electrode wire 53 commences to shrink, and the action is progressive, so that ultimately the tissue assumes the relative position shown by the dot-and-dash line 68. Obviously, as the tissue shrinks and becomes desiccated, the area in contact with the electrode wire 53 becomes smaller and smaller; and this fact, coupled with the gradually increasing resistance of the desiccated or coagulated tissue, results in automatically bringing about a set of conditions which ultimately are conducive to actual cutting. In other words, when the tissue has reached the dried and shrunken state indicated by the dot-and-dash line 68, the resistance has increased to such an extent, and the area in contact (along the bottom of the wire 53) has become so small, that a maintenance of the very same current will suddenly bring about a sparking effect at the electrode wire 53, culminating in an actual electrosurgical severance of the tissue.

Progressive desiccation and coagulation may take, for example, about thirty seconds or so. Without altering any of the characteristics of the generating circuit, and without making any changes whatsoever in connections, electrodes, or other parts of the apparatus, the procedure culminates in a true cutting effect which may last for about a second, as the wire 53 travels through the body 66.

Figure 7:
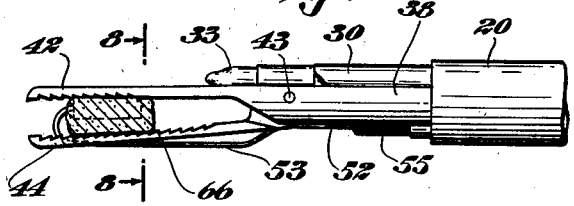
Figure 7 is a view similar to Figure 5, showing a subsequent step in the procedure.
Figure 8:
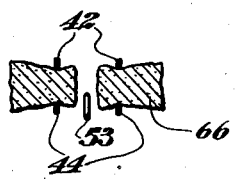
Figure 8 is a diagrammatic cross-sectional view taken substantially along the line 8—8 of Figure 7.

Since the pressure upon the jaws has been maintained, the advance of the electrode through the tissue, as it cuts, is coupled with a clamping action which ultimately positions the parts in the relationship of Figures 7 and 8. It is to be noted that the wire 53 has passed completely through the band 66, and that the latter is nevertheless efficiently and firmly clamped at areas on opposite sides of the line of cleavage. This leaves the opposed stumps in a clamped condition, holding them available for careful, unhurried inspection by the operator, and for such further treatment as may be necessary to prevent any hemorrhage after they are finally released.

It will be understood that the indifferent connection to the generator need not necessarily be made through the jaws 42 and 44, and the more conventional type of remote indifferent electrode may be used, if desired. In such an event, the jaw 44 serves the purely mechanical function of forcing the body against the operative electrode wire, and holding it in desired maintained contact; and both jaws serve the mechanical function of engaging the opposed resultant stumps as the cutting is accomplished. It is preferable, however, to employ these jaws, collectively, as the indifferent clamping electrode, inasmuch as the mode of procedure is thereby greatly simplified and rendered more efficient.

It will also be understood that the instrument illustrated, while designed primarily for the treatment of an adhesion band or the like, is not necessarily restricted in its use to a procedure of this character. It may, for example, be used for cutting through a neoplasm or growth which is not strictly in the form of an adhesion. In the latter case, the resultant stump of the growth will be engaged by one pair of opposed jaw arms, while the excised mass will be engaged by the opposite pair of opposed jaw arms. By slightly releasing the jaws, the stump may be released, without at the same time releasing the excised mass; and the jaws may then be clamped together again to withdraw the excised mass rearwardly from the interior of the body.

In a similar way, the instrument may be used for a variety of similar purposes, and the jaws may be employed, wherever necessary or desired, as purely mechanical forceps to accomplish any specific objective, depending upon circumstances.

Other electrodes, of varying configurations, depending upon the particular uses to which they are to be put, may be employed with the present instrument, and the member illustrated has been shown merely by way of a preferred example to explain the nature and general capabilities of the invention. The essential characteristic of the electrode is that it consists of an elongated conductive member securely held in fixed relationship and against which a body of tissue may be pressed in firm maintained contact, preferably in a manner which embeds the electrode well into the body, as hereinbefore described.

All of the foregoing procedures are, of course, capable of accomplishment under illuminated vision, as will be obvious from the arrangement and construction of the telescope illustratively shown in the present drawings. The formation of the jaws 42 and 44 with two spaced parallel arms permits unimpeded vision of the electrode wire and of the area which is the subject of treatment. The irrigation outlet 23 may be conveniently employed as an aspirating outlet for drawing fumes rearwardly through the instrument and hence out of the path of the objective of the telescope.

Under certain circumstances, we contemplate eliminating one of the control arms 45 and utilizing the empty guide tube 41 for purposes of irrigation, either liquid or gaseous.

It will also be observed that, from certain aspects, the fixed jaw 42 is not always essential. That is, so far as the clamping of a body against the electrode wire is concerned, the movable jaw 44 is in itself a sufficient instrumentality for effecting this purpose.

We have found the present instrument useful for the treatment and severance of adhesions generally, both pulmonary and abdominal; also in the treatent and removal of growths and protrusions in the rectum, lower bowels, trachea, bronchi, and oesophagus; and in the general treatment, cutting, and excision of a variety of neoplastic and papillomatous growths and masses.

The characterizing feature of our invention lies in the fact that a single current, and a single electrode, are employed to accomplish, automatically and in succession, a predetermined progressive desiccation and coagulation and an ultimate true cutting; and, more especially, in the employment of a current which is greater than a coagulating current yet less than an ordinary instantaneous-cutting current; whereby the proper conditions to accomplish the foregoing ends are automatically brought about.

In general, it will be understood that changes in the details herein described and illustrated, for the purpose of explaining the nature of our invention, may be made by those skilled in the art without departing from the spirit and scope of the invention as expressed in the appended claims. It is, therefore, intended that these details be interpreted as illustrative, and not in a limiting sense.

Having thus described our invention, and illustrated its use, what we claim as new and desire to secure by Letters Patent is—

1. In an instrument of the character described, a pair of complementary U-shaped jaws pivoted to each other at the ends of the U's, means for pivoting said jaws relative to each other, an electrode wire carried in insulated relation by one of said jaws in the plane of the axis of said jaw, said wire being arranged to project through the space between the arms of the other jaw when the jaws are closed, and means insulated from the jaws for conducting a high-frequency current to said wire.

2. In an instrument of the character described, a pair of complementary U-shaped jaws pivoted to each other at the ends of the U's, one of said jaws being fixed and the other being movable toward and away from closed relation to said fixed jaw, means for moving said movable jaw relative to the other, an electrode wire carried in insulated relation by said fixed jaw in the plane of the axis of said jaw, said wire being arranged to project through the space between the arms of the movable jaw when the jaws are closed, and means insulated from the jaws for conducting a high-frequency current to said wire.

3. In an instrument of the character described, a clamping electrode comprising a pair of complementary conductive U-shaped jaws pivoted to each other at the ends of the U's, means for pivoting said jaws relative to each other, an electrode wire carried in insulated relation by one of said jaws in the plane of the axis of said jaw, said wire being arranged to project through the space between the arms of the other jaw when the jaws are closed, a source of high-frequency current, means for connecting an indifferent terminal of said source to said clamping electrode, and means for connecting an active terminal of said source to said wire.

4. In an instrument of the character described, an endoscopic sheath, an elongated supporting stem insertable into said sheath, a pair of complementary U-shaped jaws mounted at the forward end of said stem, means carried by said stem for controlling the operation of said jaws from the rear end of the instrument, a longitudinal electrode wire carried in insulated relation by one of said jaws, said wire being arranged to project through the space between the arms of the other jaw when the jaws are closed, an electric binding post at the rear end of said stem, and means insulated from the stem for conducting a high-frequency current from said binding post to said wire.

5. In an instrument of the character described, an endoscopic sheath, an elongated supporting stem insertable into said sheath, a pair of complementary U-shaped jaws mounted at the forward end of said stem, means carried by said stem for controlling the operation of said jaws from the rear end of the instrument, a longitudinal electrode wire carried in insulated relation by one of said jaws, said wire being arranged to project through the space between the arms of the other jaw when the jaws are closed, an electric binding post at the rear end of said stem, means insulated from the stem for conducting a high-frequency current from said binding post to said wire, and telescopic and illuminating means carried by said stem for commanding an illuminated visibility of the wire through the space between the arms of the jaws.

6. In an instrument of the character described, an insulating endoscopic sheath, a conductive elongated supporting stem insertable into said sheath, a pair of conductive complementary U-shaped jaws mounted at the forward end of said stem in mutually uninsulated relation and uninsulated from said stem, means carried by said stem for controlling the operation of said jaws from the rear end of the instrument, a longitudinal electrode wire carried in insulated relation by one of said jaws and arranged to project through the space between the arms of the other jaw when the jaws are closed, an electric binding post at the rear end of said stem and insulated from the latter, and means insulated from the stem for conducting a high-frequency current from said binding post to said wire, whereby the jaws may be employed as an indifferent clamping electrode.

7. In an instrument of the character described, an elongated stem, a fixed U-shaped jaw carried by the forward end of said stem, a complementary U-shaped jaw pivoted at its rear end to the first-named jaw, a longitudinal electrode wire carried by the fixed jaw along the axis of the latter and having its forward end supported by the forward portion of said jaw, said wire being arranged to project through the space between the arms of the movable jaw when the jaws are closed, an electric binding post mounted in insulated relationship at the rear end of the stem, insulated means for electrically connecting said binding post with said wire, and means for insulating the forward end of said wire from the fixed jaw at the area of support.

8. In an instrument of the character described, an elongated stem, a fixed U-shaped jaw projecting longitudinally from the forward end of said stem, a longitudinal electrode wire carried in insulated relation by said jaw and alongside of the plane of said jaw, a complementary U-shaped jaw pivoted at its rear end to the rear of the fixed jaw, means controllable from the rear of the stem for moving said movable jaw so as to clamp a body between the jaws and thereby press the clamped body into firm contact with said wire, and means for removably mounting said electrode wire in association with said fixed jaw.

9. In an instrument of the character described, an elongated stem, a fixed U-shaped jaw projecting longitudinally from the forward end of said stem, a longitudinal electrode wire carried in insulated relation by said jaw and alongside of the plane of said jaw, a complementary U-shaped jaw pivoted at its rear end to the rear of the fixed jaw, means controllable from the rear of the stem for moving said movable jaw so as to clamp a body between the jaws and thereby press the clamped body into firm contact with said wire, and means for removably mounting said electrode wire in association with said fixed jaw, said means comprising a clamp at the rear of said stem and a bearing carried by the forward portion of the fixed jaw, and extensions at the rear and forward ends of said wire for engaging respectively with said clamp and bearing.

10. In an instrument of the character described, an elongated stem, a fixed U-shaped jaw projecting longitudinally from the forward end of said stem, a longitudinal electrode wire carried in insulated relation by said jaw and alongside of the plane of said jaw, a complementary U-shaped jaw pivoted at its rear end to the rear of the fixed jaw, means controllable from the rear of the stem for moving said movable jaw so as to clamp a body between the jaws and thereby press the clamped body into firm contact with said wire, a binding post mounted in insulated relation at the rear of the stem, and means for removably mounting said electrode wire in association with said fixed jaw and in insulated electrical connection with said binding post.

11. In an instrument of the character described, an elongated stem, a fixed U-shaped jaw projecting longitudinally from the forward end of said stem, a longitudinal electrode wire carried in insulated relation by said jaw and alongside of the plane of said jaw, a complementary U-shaped jaw pivoted at its rear end to the rear of the fixed jaw, means controllable from the rear of the stem for moving said movable jaw so as to clamp a body between the jaws and thereby press the clamped body into firm contact with said wire, a binding post mounted in insulated relation at the rear of the stem, and means for removably mounting said electrode wire in association with said fixed jaw and in insulated electrical connection with said binding post, said means comprising a clamp adjacent to said binding post, an insulated bearing at the forward portion of the fixed jaw, an extension on the forward end of the electrode wire adapted to engage said bearing, and an insulated conductive extension on the rear end of the electrode wire and adapted to engage with said clamp.

FREDERICK CHARLES WAPPLER.
REINHOLD H. WAPPLER.